June 29, 1954 E. O'E. JOHNSON 2,682,608

INDOOR TELEVISION ANTENNA

Filed March 16, 1950

INVENTOR.
ERNEST O. JOHNSON

BY Charles H. Brown

ATTORNEY

Patented June 29, 1954

2,682,608

UNITED STATES PATENT OFFICE 2,682,608

INDOOR TELEVISION ANTENNA

Ernest O'Easten Johnson, Haddonfield, N. J., assignor to Radio Corporation of America, a corporation of Delaware Application March 16, 1950, Serial No. 149,975

6 Claims. (Cl. 250—33)

The invention relates to radio wave antennas and particularly pertains to antennas for television reception which can be conveniently installed indoors or inside television receiver cabinets.

In the reception of television signals, an adequate antenna system is particularly important, especially with respect to the band width and efficiency of the receiving system. Acceptance of television broadcasting by the general public is dependent in some measure upon the availability of an antenna which will bring in the required signals and at the same time afford convenient and economical installation. One particularly difficult problem in the installation of television receivers in the home, especially in urban areas, arises from the practical impossibility of erecting a suitable antenna, on multiple dwellings, which will not interfere with other antennas located thereon. Occupants of single dwellings also have sometimes shown reluctance, for both economical and esthetic reasons, to erect an outdoor antenna. The simple indoor television antennas previously suggested for such use have provided to be lacking in efficiency and overall performance over the band of frequencies presently assigned to television program transmission.

Since there are usually only three or four television channels on which reception is desired at a given location, it appears that considerable advantage may be gained by providing an antenna system which can be adjusted to favor the desired channels to a certain extent.

Therefore, it is an object of the invention to provide a television receiving antenna for installation in close proximity to the television receiver which can be adjusted to provide increased performance on desired channels.

It is another object of the invention to provide an adjustable television receiving antenna which is highly efficient considering its small physical size, and which can be simply and inexpensively manufactured and adjusted.

It is a specific object of the invention to provide an adjustable television antenna in accordance with the foregoing objects which can be assembled from components commercially available for other purposes.

It is a further object of the invention to provide a television receiving antenna capable of adequate performance under conditions of indoor operation with substantially any television receiver on the market.

These and other objects of the invention are realized in a compact, self-supporting, resonant half-wave dipole antenna the arms of which are extended in helical fashion in opposing directions. The pitch of the winding determines the frequency response characteristic. The entire antenna is capable of being oriented by hand to vary the directivity.

Figure 1:
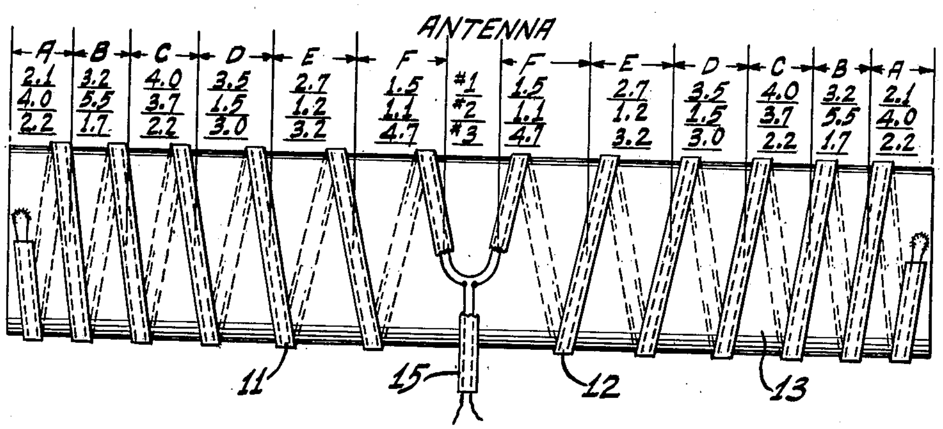
Figure 2:
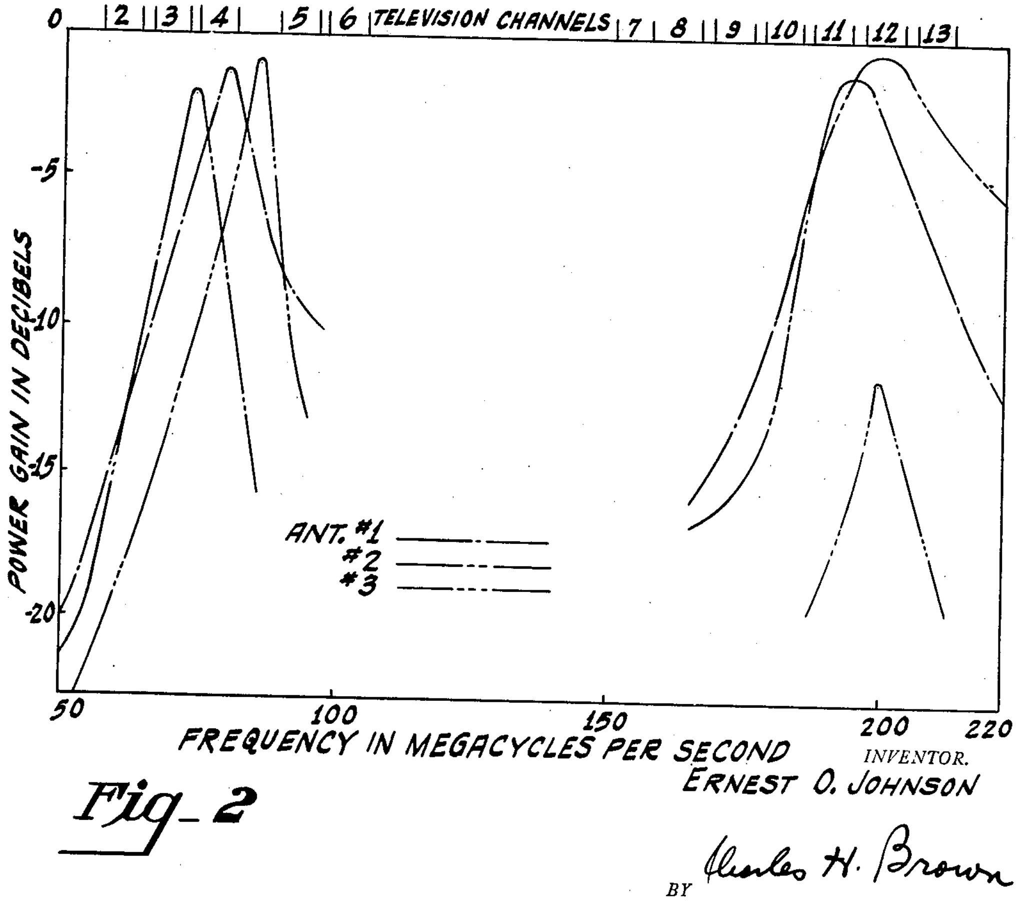

The invention will be described with reference to the accompanying drawing forming a part of the specification and in which:

Fig. 1 illustrates one practical embodiment of a compact television antenna according to the invention; and Fig. 2 is a graphical representation of the performance of the antenna according to the invention.

Referring to Fig. 1, there is shown a compact television receiving antenna according to the invention. The antenna is constituted by two-conductor polyethylene spaced transmission line portions 11 and 12 which are arranged end-to-end and wound in opposing directions about a tubular insulating member 13. The remote ends of the individual conductors constituting transmission line portions 11 and 12 are connected together in a manner similar to that of a folded dipole. Transducer apparatus (not shown) is coupled at the center of the antenna by means of a length of twin-conductor transmission line 15. It has been found that a length of 300 ohm, poly-ethylene insulated, flat ribbon transmission line is preferable for coupling the above described antenna to most television receivers on the market because this line is the RMA standard for television and FM receivers.

The above described antenna may be constructed of any materials suitable for the purpose. Preferably, however, 11 and 12 are constituted by lengths of commercially available twin-conductor transmission line of the type described above, used for interconnecting antennas and television receivers.

For receiving television signals on channels 2–13 covering the range of frequencies between 54 and 216 mc./s. the end-to-end length of portions 11 and 12 is preferably 100 inches and insulator 13 is preferably 2¾ inches in diameter and 33 inches long. In conjunction with these dimensions, the individual turns are preferably spaced at varying distances. The spacing for three different embodiments are indicated in the table above the cylinder 13. Increased effectiveness at certain frequencies and sufficient compactness to enable easy rotation of the entire assembly for orientation with the television broadcast station to which the receiver is tuned are obtained by such spacing, while still maintaining efficient signal pickup.

Tuning of the antenna to heighten response to frequencies between limits is effected by adjusting the spacing intermediate the individual turns. The spacing does not cause the antenna to pick up appreciably more signal since this is essentially a function of antenna length. It does, however, change the impedance characteristic of the folded dipole to vary from those normally obtained. Concentrating the winding near the ends provides a larger received signal to be transferred to transmission line 15 on the high frequency channels while concentrating the winding near the center provides greater output on the lower channels. For each installation it is generally possible to find one spacing variation which will provide good reception on all channels available at the location, thus obviating the need for adjusting the antenna between channels. A plastic solvent or cement or tape can be applied to stick the transmission line portions 11 and 12 to insulator 13 after the necessary adjustments have been made. For reception on any particular channel, the antenna is rotated by hand until maximum signal strength and clarity of picture is obtained.

The antenna may be supported in any known way. A base and support pleasing to the eye and harmoniously adaptable to the surroundings in which television sets are usually found is considered desirable. While the use of readily available components is contemplated, it is clearly within the scope of the invention to form the helical portion of rather stiff self-supporting wire which is sufficiently fictile to permit adjustment. In such an embodiment a short insulator at the center only is required. The insulator and the folded dipole are preferably supported on a tubular member inserted in a pedestal, made of any suitable material.

The folded dipole arms may be made slightly conical in shape in order to afford greater strength and provide more pleasing appearances. A length of flat ribbon transmission line is electrically connected to portions 11 and 12 and run down through the tubular member and the base. The other end of the transmission line is connected to the antenna terminals of the television receiver in the normal manner.

The frequency response characteristic of the antenna may be seen by referring to Fig. 2. The different spacings clearly shift the response characteristic of the antenna.

The directive response of the antenna according to the invention is a figure eight pattern, similar to that of a simple dipole, with maximum response in a plane 90° to the axis of the conductors 11, 12, but if the concentration of the winding at the center of the antenna is carried too far, a multi-lobed pattern will result. Directors, reflectors and other coupled elements may be added to the device to vary its gain and directivity patterns, just as may be done with any simple dipole antenna, but such arrangements are not contemplated in practice for obvious reasons.

It is possible to vary the design considerably and still maintain the same tuning range, by making the conductors 11, 12 of different length and changing the diameter of the winding. In this manner an antenna sufficiently compact to be included in the cabinet of a console television receiver can be realized. As noted above, the signal pickup is a function of antenna length, therefore shorter conductors will make the antenna less efficient. However, a compromise must be made between efficiency and physical size for indoor applications. The dimensions given herein are but a few examples of such compromises.

While the invention has been described in terms of express embodiments, it should be understood that many obvious modifications will be suggested to those skilled in the art without departing from the spirit and scope of the invention.

The invention claimed is:

1. An antenna including a pair of elongated conductors substantially equidistantly spaced from each other throughout their entire length with the ends of said conductors connected together, one of said conductors having a discontinuity therein at substantially the center thereof, and means to couple transducer apparatus across said discontinuity, said conductors being wound in helical formation in opposing directions on each side of said discontinuity, the spacing between adjacent turns of said conductors increasing from turn to turn toward the center of said conductors.

2. An antenna including a pair of elongated conductors spaced substantially equidistantly from each other throughout the length thereof, the ends of said conductors being connected together, one of said conductors being interrupted intermediate the ends thereof, and terminals at said interruption, said conductors being wound in helical formation in opposing directions on each side of said terminals, the spacing between adjacent turns of said conductors decreasing from turn to turn toward the outer ends of said wound conductors.

3. An antenna including three elongated conductors, the length of one of said conductors being substantially the sum of the lengths of the other two conductors, said other two conductors being arranged in end-to-end relationship along said one conductor and substantially equidistantly spaced therefrom, the outer ends of said conductors being connected together, the inner ends of said other conductors having a terminal means thereon adapted to be coupled to transducer apparatus, said conductors being wound in helical formation, said other conductors being wound in opposing directions, with respect to each other, the spacing between adjacent turns of said conductors increasing toward the terminals of said other conductors.

4. An antenna for use over a band of frequencies including a pair of elongated loop conductors, said loop conductors being wound in helical formation in opposing directions, each of said loop conductors having two adjacent terminals, one terminal of one loop conductor being connected to one terminal of the other loop conductor, and means to couple transducer apparatus to the remaining terminals of said loop conductors, the spacing between the turns of said helically wound conductors increasing toward said terminals to increase the efficiency of operation at the higher frequencies of said band.

5. An antenna for use over a band of frequencies including an elongated insulating member, a length of transmission line wound in given direction about one end of said member, a further length of transmission line wound in direction opposite to said given direction about the other end of said member, said lengths of transmission line being short-circuited at the remote ends thereof, one conductor of one transmission line being connected to one conductor of the other at the inner ends of said lengths of transmission line, the spacing between adjacent turns of wound transmission line decreasing toward the outer ends of said lengths of line to increase the efficiency of operation at the higher frequencies of said band and means to couple transducer apparatus to the remaining conductors of said transmission lines.

6. An antenna including a pair of elongated conductors spaced substantially equidistantly from each other throughout the length thereof, the ends of said conductors being connected together, one of said conductors being interrupted intermediate the ends thereof, and terminals at said interruption, said conductors being wound in helical formation in opposing directions on each side of said terminals, the spacing between adjacent turns first changing in one sense and then changing in an opposite sense toward the outer ends.

References Cited in the file of this patent

UNITED STATES PATENTS

| Number | Name | Date |
|---|---|---|
| 1,684,009 | Brown | Sept. 11, 1928 |
| 2,283,914 | Carter | May 26, 1942 |
| 2,533,529 | Spindler | Dec. 12, 1950 |

FOREIGN PATENTS

| Number | Country | Date |
|---|---|---|
| 576,776 | Germany | May 18, 1933 |
| 34,068 | France | Nov. 10, 1928 |

OTHER REFERENCES

"A Helical Antenna for Circular Polarization," pages 1484–1488, Proceedings of the I. R. E., December 1947.

Wireless World, July 1949, page 257.

Electronics, April 1947, pages 109, 110, 111.